June 27, 1967     R. GOODACRE     3,327,384
MANUFACTURE OF VEHICLE DIFFERENTIAL CASINGS
Filed March 30, 1965     2 Sheets-Sheet 1
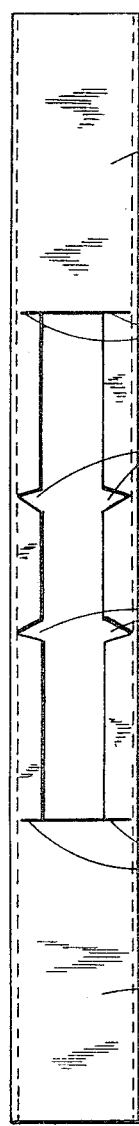
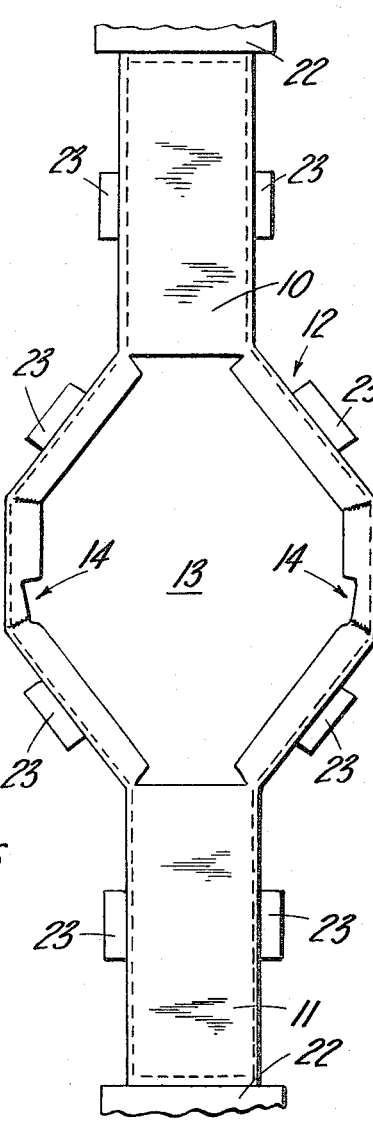

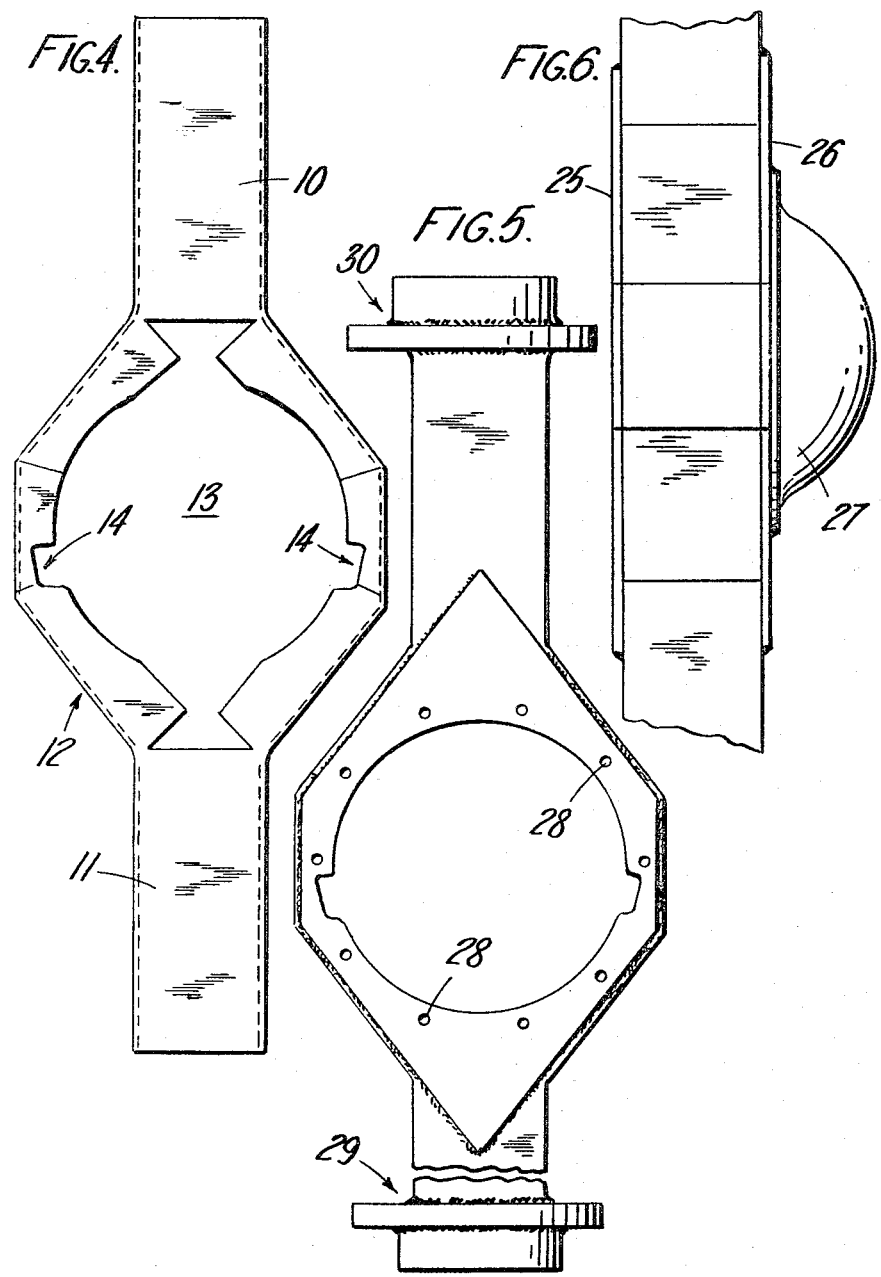

United States Patent Office 3,327,384
Patented June 27, 1967

3,327,384
MANUFACTURE OF VEHICLE DIFFERENTIAL CASINGS
Ronald Goodacre, Basingstoke, England, assignor to Lansing Bagnall Limited, Basingstoke, England, a British company
Filed Mar. 30, 1965, Ser. No. 443,919
Claims priority, application Great Britain, Apr. 9, 1964, 14,776/64
12 Claims. (Cl. 29—475)

ABSTRACT OF THE DISCLOSURE

Method of forming a casing part for a differential mechanism of a vehicle drive transmission comprising slitting a straight rectangular metal tube and deforming opposite sides of the tube outwardly away from each other.

---

This invention relates to the manufacture of casings for differential mechanisms of vehicle drive transmissions.

According to this invention there is provided a method of forming a casing part for a differential mechanism of a vehicle drive transmission, which method comprises the steps of cutting, through opposite sides of a straight tube, two slots which extend axially over a middle part of the length of the tube, forming at each end of each of the two slots, two deep slits or notches one on each side of the slot and, at each side of each slot, and intermediate the two end slits or notches, at least one deep notch, each slot or notch having a mouth which opens to the slot, and the depth of each slit or notch extending transversely to the length of the slot and peripherally of the tube, and causing the portions of the tube on opposite sides of the slots to be deformed a predeterminate amount outwardly away from each other.

It is preferred that the portions of the tube are deformed by compressing the tube axially. In such a case it is preferred that at least a part of said middle part of the length of the tube is confined in a die during the axial compression of the tube, which die controls the amount of deformation of the tube. Alternatively the portions of the tube may be deformed by pulling outwardly on each portion of the tube.

Preferably an apertured plate is attached to one of the said opposite sides of the tube to enable the pinion assembly for driving the crown wheel to be bolted to that side of the tube and a solid plate is attached to the other of said opposite sides of the tube to seal that other side of the tube. The said solid plate preferably has an outwardly protruding dome portion, which dome portion may be made separately from the remainder of the said plate.

In one preferred method the tube is of square, or other rectangular cross-section, and the slots are formed in the middle of said sides.

The tube may be locally reinforced by one or more sleeves, for example internal sleeves, the sleeve or sleeves fitting the tube closely and being secured thereto, preferably by welding. In one arrangement the end portions of the tube are reinforced in this manner.

The invention also provides a casing part made by a method as set forth in the second paragraph of this statement.

One embodiment of the invention will now be described by way of example with reference to the accompanying drawings in which:

FIGURE 1 shows a view of the rearward side of a tube formed with a slot, slits and notches and ready for axial compression, FIGURE 2 shows the same side of the tube of FIGURE 1 after compression, FIGURES 3 and 4 are views of the front corresponding respectively to FIGURES 1 and 2, and FIGURES 5 and 6 respectively show front and side views of the completed casing.

A conventional transmission for driving the ground wheels of a vehicle comprises a differential mechanism and two shafts, commonly called half shafts, which are respectively driven by two sun wheels of the differential mechanism. A casing member for such a differential mechanism and its half shafts is shown in FIGURES 2 and 4 and comprises two tubular end portions 10, 11 of square cross-section through which the two half shafts respectively can extend and a flanged middle portion 12 providing a space 13 for accommodating the differential mechanism. In the construction shown slots 14 (FIGURES 2 and 4) have been cut in the flanges of the middle portion to provide a clearance for the crown wheel of the differential mechanism and these slots may be formed before or after the formation of the casing.

Referring now to FIGURES 1 and 3, the casing member is formed from a tube of square cross-section. The rearward side of the tube (FIGURE 1) has a symmetrically disposed slot 15 cut in it which extends axially over the part of the length of the tube which is to be deformed to accommodate the differential mechanism. Two slits 16 are cut through the side of the tube at each end of the slot 15 and extend peripherally of the tube in opposite directions to each other, respectively terminating substantially in the planes of the inner faces of the unslotted sides of the tube as shown. At each side of slot 15, between the two end slits 16, two V-notches 17 are cut through the side of the tube, and are symmetrically disposed lengthwise of the slot, the depth of the V-notches being similar to that of the slits 16.

The forward side of the tube, shown in FIGURE 3, has an axially extending slot 18 cut therein which is disposed opposite and is of the same axial length as slot 15. The end portions 19 of slot 18 are very narrow. Two slits 20 are formed at each end of slot 18 and are disposed similarly to and opposite slits 16. Two V-notches 21 are cut in each side of slot 18, the bottoms of these notches being substantially in the planes of the inner faces of the unslotted sides respectively. Notches 21 are respectively disposed opposite the four notches 17. The sides of slot 18 are scalloped as shown.

The two parts of the tube on opposite sides of the slots 15, 18 are thus of channel section, the two sides of each channel being notched at intervals.

The tube shown in FIGURES 1 and 3 is placed in a press having shoes indicated at 22 in FIGURE 2, and fixed die members 23 are disposed on each side of the tube to define the final shape of the tube. The tube is then compressed axially in the press and deformation of the tube occurs until it takes the shape shown in FIGURES 2 and 4. The shoes 18 move the same distance as each other during the compression so that the middle of the tube does not shift lengthwise of the tube.

It will be noted that in the compression process, slots 15 and 18 widen, the slits 16 and 20 open to become V-notches, and the original V-notches close to become slits. The two edges of each of the closed notches 17 and 21 are then welded together.

The scalloped edges of slot 18 fit together to define a circular aperture on the forward side of the member.

Referring now to FIGURES 5 and 6, two apertured machined plates 25, 26 are then welded respectively by their edges on to the front and rear sides of the casing member, and a domed cover 27 is then welded on to the rear plate 26 over the aperture therein so as to seal the rear side of the casing. A ring of tapped holes 28 is then formed in the plate 25 and the underlying flanges of the casing member to enable the pinion assembly for driving the crown wheel to be bolted to the differential casing. End members 29, 30 are welded to the ends of the tube to provide bearing housings for the road wheels and to provide mounting plates for brake assemblies. The rear plate 26 and cover 27 can of course be made in one piece.

If desired, the tube may be reinforced locally by internally or externally fitting sleeves welded or otherwise secured to the tube. In one arrangement, reinforced sleeves are fitted in the end portions of the tube and welded in position, the ends of these reinforcing sleeves projecting beyond the ends of the tube and having the end members, such as 29, 30, welded to them.

It is to be appreciated that the invention is not limited by the specific details of the above description, for example, instead of the forward side and the rearward side of the tube being cut in the manner described above, both sides of the tube may be cut in the same manner. In such a case both sides are preferably cut in the manner described above in respect of the rearward side of the tube.

Also although the sides of the tube are, in the above example, deformed by compressing the tube axially in a press, the sides of the tube may alternatively be deformed by pulling outwardly on each side of the tube.

I claim:

1. A method of forming a casing part for a differential mechanism of a vehicle drive transmission, which method comprises the steps of cutting, through opposite sides of a straight rectangular-section tube, two slots which extend axially over a middle part of the length of the tube, forming at each end of the two slots, two deep slits or notches one on each side of the slot and, at each side of each slot, and intermediate the two end slits or notches, at least one deep notch, each slit or notch having a mouth which opens to the slot, and the depth of each slit or notch extending transversely to the length of the slot and peripherally of the tube, and causing the portions of the tube on opposite sides of the slots to be deformed a predetermined amount outwardly away from each other.

2. A method as claimed in claim 1 in which the portions of the tube are deformed by compressing the tube axially.

3. A method as claimed in claim 2 in which at least a part of said middle part of the length of the tube is confined in a die during the axial compression of the tube, which die controls the amount of deformation of the tube.

4. A method as claimed in claim 1 in which the portions of the tube are deformed by pulling outwardly on each portion of the tube.

5. A method as claimed in claim 1 in which an apertured plate is attached to one of the said opposite sides of the tube to enable the pinion assembly for driving the crown wheel to be bolted to that side of the tube and a solid plate is attached to the other of said opposite sides of the tube to seal that other side of the tube.

6. A method as claimed in claim 5 in which the solid plate has an outwardly protruding dome portion.

7. A method as claimed in claim 6 in which the dome portion is made separately from the remainder of the said plate.

8. A method as claimed in claim 1 in which the tube is square and the slots are formed in the middle of said sides.

9. A method as claimed in claim 1 in which the tube is locally reinforced by at least one sleeve, each sleeve fitting the tube closely and being secured thereto.

10. A method as claimed in claim 9 in which each sleeve is an internal sleeve.

11. A method as claimed in claim 9 in which each sleeve is secured in position by welding.

12. A method as claimed in claim 9 in which the end portions of the tube are reinforced in this manner.

References Cited

UNITED STATES PATENTS

| | | | |
|---|---|---|---|
| 1,715,135 | 5/1929 | Lambert | 72—294 |
| 2,153,287 | 4/1939 | Wallace et al. | 72—607 |
| 2,199,502 | 5/1940 | Maddock | 72—324 X |
| 3,015,238 | 1/1962 | Williams | 74—607 |

WILLIAM W. DYER, JR., *Primary Examiner.*

LEONIDAS VLACHOS, *Examiner.*